United States Patent [19]

Katsumata et al.

[11] Patent Number: 5,586,263
[45] Date of Patent: Dec. 17, 1996

[54] HIGH SPEED DATA COMMUNICATION CONTROL DEVICE HAVING AN UNCOMPETITIVE BUS CONSTRUCTION

[75] Inventors: Eiichi Katsumata, Tokyo; Koichi Tanaka, Kawasaki, both of Japan; Toshiyuki Yaguchi, Mountain View, Calif.; Akira Kanuma; Akihito Nishikawa, both of Yokohama, Japan

[73] Assignee: Kabushiki Kaisha Toshiba, Kawasaki, Japan

[21] Appl. No.: 13,212

[22] Filed: Feb. 1, 1993

Related U.S. Application Data

[63] Continuation of Ser. No. 522,883, May 14, 1990, abandoned.

[30] Foreign Application Priority Data

May 13, 1989 [JP] Japan ................................ 1-120151

[51] Int. Cl.⁶ .............................. G06F 13/28; G06F 13/16
[52] U.S. Cl. ................................ 395/200.07; 364/DIG. 1; 364/DIG. 2; 395/848
[58] Field of Search ........................ 395/425, 400, 395/200, 325, 800, 275, 250, 725, 482, 823, 404, 200.01, 844, 848, 200.07; 364/DIG. 1, DIG. 2, 132, 134; 340/825.51, 825.52

[56] References Cited

U.S. PATENT DOCUMENTS

| | | | |
|---|---|---|---|
| 4,276,594 | 6/1981 | Morley | 395/800 |
| 4,493,021 | 1/1985 | Agrawal et al. | 364/200 |
| 4,590,468 | 5/1986 | Stieglitz | 364/200 |
| 4,604,683 | 8/1986 | Russ et al. | 364/200 |
| 4,646,324 | 2/1987 | Albano et al. | 375/38 |
| 4,660,141 | 4/1987 | Ceccon et al. | 395/275 |
| 4,724,521 | 2/1988 | Carron et al. | 364/300 |
| 4,744,078 | 5/1988 | Kowalczyk | 370/85 |
| 4,747,047 | 5/1988 | Coogan et al. | 395/275 |
| 4,751,634 | 6/1988 | Burrus, Jr. et al. | 395/275 |
| 4,845,609 | 7/1989 | Lighthart et al. | 395/275 |
| 4,891,751 | 1/1990 | Call et al. | 364/200 |
| 4,933,846 | 6/1990 | Humphrey et al. | 364/200 |
| 5,058,109 | 10/1991 | Goldberg et al. | 370/85.13 |

FOREIGN PATENT DOCUMENTS

WO88/10469 12/1988 WIPO .

OTHER PUBLICATIONS

M. J. Drumm, et al., *Computer Design*, vol. 23, No. 9, Aug. 1984, pp. 145–148, 150–151, "Dual–port Static RAMs can Remedy Contention Problems".

M. S. Madan, *Computer Communications*, vol. 9, No. 6, Dec. 1986, pp. 282–286, "Performance Monitor for Operational LAN".

S. Gandhi, *Electronik*, vol. 36, No. 12, Jun. 12, 1987, pp. 77–78, 80–82, "Mikrocontroller Koppelt Prozessoren".

*Primary Examiner*—Daniel H. Pan
*Attorney, Agent, or Firm*—Foley & Lardner

[57] ABSTRACT

A data communication control device controls data transmission between a network bus and a system bus. The data communication control device includes a network bus interface connected to the network bus, a system bus interface connected to the system bus. A port 1 of the two-port memory in an FIFō/RAM is connected to the network bus interface, microprocessor, direct memory access through a first bus. A port 2 of the two-port memory in the FIFō/RAM is connected to the direct memory access through a second bus. The microprocessor is connected to the system bus interface through a third bus. The direct memory access is connected to the system bus interface through a fourth bus.

3 Claims, 4 Drawing Sheets

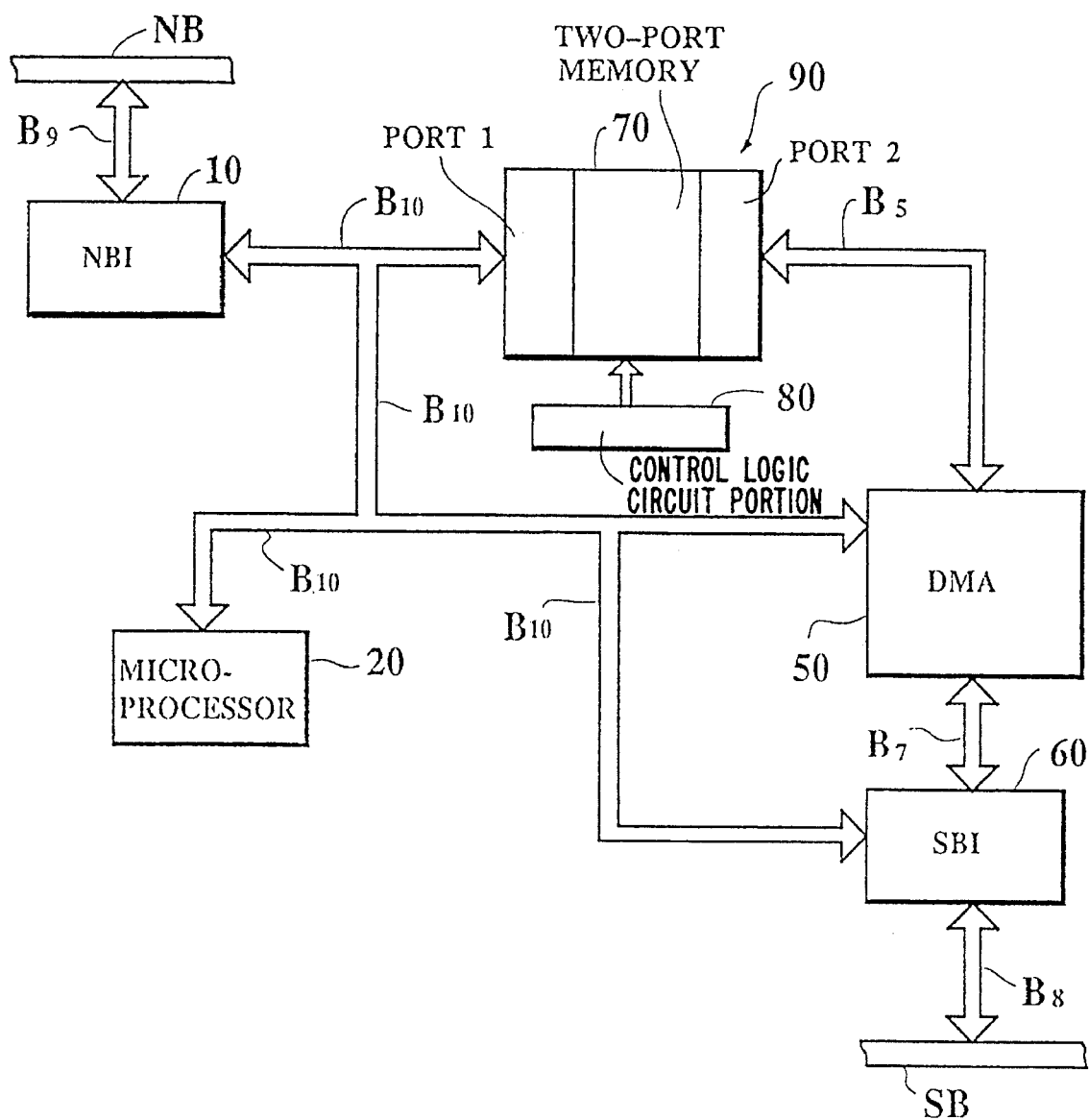

HIGH SPEED DATA COMMUNICATION CONTROL DEVICE HAVING AN UNCOMPETITIVE BUS CONSTRUCTION

This application is a continuation of application Ser. No. 07/522,883, filed May 14, 1990 now abandoned.

BACKGROUND OF THE INVENTION

1. Field of the Invention

The present invention relates to a data communication control device having an uncompetitive bus construction which enables high-speed data communication.

2. Description of the Prior Art

A data communication control device for controlling data transmission between a network bus NB and a system bus SB of a host processor is well known.

Before an explanation on the data communication control device of the prior art, the role of the data communication control device in the entire body of a system is described.

As shown in FIG. 1, the system includes a host processor 100, a data communication control device 200 connected between a system bus SB connected to the host processor 100 and a network bus NB, a read-only memory (ROM) 300 in which is stored a data communication procedure for controlling the data communication control device 200, a random access memory (RAM) 400 for containing data to be transmitted and received through the system bus SB, and a terminal 500 connected to the network bus NB. In the transmission mode, data contained in the RAM 400 are transmitted to the network bus NB from the system bus SB by the data communication control device 200. While, in the reception mode, data derived from the terminal 500 are received in the RAM 400 through the system bus SB from the network bus NB by the data communication control device 200. Namely, according to the above construction, transmission control of data is carried out between the system bus SB and the network bus NB by the data communication control device 200.

Next, a construction of a data communication control device according to the prior art will be explained with reference to FIG. 2.

As shown in FIG. 2, the data communication control device is composed of a network bus interface (NBI) 10, a microprocessor 20 for controlling data transmission, a control logic circuit portion 30, a two-port memory 40 for holding transmission data, a direct memory access (DMA) portion 50 for carrying out access of the two-port memory, a system bus interface (SBI) 60 and a switch 70. Incidentally, reference character NB shows a network bus and SB shows a system bus of a host processor. Moreover, a port 1 of the two-port memory 40, a buffer 2 of the SBI 60 and the microprocessor 20 are connected by a data bus $B_3$, and a port 2 of the two-port memory 40 and the switch 70 are connected by a data bus $B_4$, further the switch 70 and NBI 10 and DMA 50 are respectively connected by data buses $B_1$ and $B_2$. In the system, the switch 70 is switched under control of the control logic circuit portion 30 to alternately connect the data buses $B_1$, $B_2$ to the data bus $B_4$ connected to the port 2 of the two-port memory 40.

Next, operation of the data communication control device of the prior art with the construction as mentioned above will be described.

First, the transmission mode from the system bus SB to the network bus NB is explained.

When a command of data transmission is transmitted to the data communication control device from the host processor 100 through the system bus SB, the command is transmitted to the buffer 2 of the SBI 60, then is given to the microprocessor 20 through the data bus $B_3$.

Then, transmission data are transmitted to the buffer 1 of the SBI 60 from the RAM 400 through the system bus SB, then are given to the switch 70 through the DMA 50 and the data bus $B_2$. At the same time, a part of the transmission data from the RAM 400 are given to the buffer 2 of the system bus interface (SBI) 60, then transmitted to the port 1 of the two-port memory 40 through the data bus $B_3$. The switch 70 is switched in accordance with control of the microprocessor 20 which received the transmission command and the control logic circuit portion 30 so as to connect the data bus $B_2$ and the data bus $B_4$, then the transmission data are inputted to the port 2 of the two-port memory 40 through the data bus $B_4$. Thereafter, the two-port memory 40 changes or arranges the transmission data in accordance with control of the microprocessor 20 and the control logic circuit portion 30, and a part of the transmission data arranged and the transmission data transmitted to the port 1 are transmitted to the switch 70 through the data bus $B_4$. Then, the switch 70 is switched under control of the microprocessor 20 and the control logic circuit portion 30 so as to connect the data bus $B_4$ and the data bus $B_1$, and the transmission data are transmitted to the network bus NB through the data bus $B_1$ and the NBI 10.

Next, the reception mode of data from the network bus NB to the system bus SB is described.

First, a command of data reception is transmitted to the buffer 2 of the SBI 60 from the host processor 100 through the system bus SB, and given to the microprocessor 20 through the data bus $B_3$. Then, reception data are transmitted to the NBI 10 from the terminal 500 through the network bus NB, thereafter given to the switch 70 through the data bus $B_1$. The switch 70 is switched under control of the microprocessor 20 which received the reception command and the control logic circuit portion 30 so as to connect the data bus $B_1$ and the data bus $B_4$. Thereafter, the reception data are inputted to the port 2 of the two-port memory 40 through the data bus $B_4$. Then, the two-port memory 40 changes or arranges the reception data in accordance with control of the microprocessor 20 and the control logic circuit portion 30, and the reception data arranged are transmitted to the switch 70 through the data bus $B_4$ from the port 2. The switch 70 is switched under control of the microprocessor 20 and the control logic circuit portion 30 so as to connect the data bus $B_4$ and the data bus $B_2$, and the reception data are transmitted to the system bus SB through the data bus $B_2$, DMA 50 and SBI 60.

However, in the data communication control device according to the prior art as shown in FIG. 2, the switch 70 is provided on the side of the port 2 in the two-port memory 40 so as to switch the data buses $B_1$ and $B_2$ under control of the control logic circuit portion 30 on each transmission or reception of data. Accordingly, elevation of the operational speed of the switch 70 is so limited that it is difficult to realize high-speed data transmission.

Moreover, since the buffer 2 of the SBI 60, the microprocessor 20 and the port 1 of the two-port memory 40 are connected by the one line of data bus $B_3$, competition on use of the data bus $B_3$ is caused between the port 1 of the two-port memory 40, microprocessor 20 and SBI 60. Thus, the operation of the microprocessor 20 is restricted.

For example, in the transmission mode, the command from the system bus SB is transmitted to the microprocessor 20 through the system bus interface (SBI) 60 and the data bus $B_3$ as well as a part of the transmission data from the system bus SB are transmitted to the port 1 of the two-port memory 40 through the system bus interface (SBI) 60 and the data bus $B_3$. Accordingly, the utilization rate or factor of the data bus $B_3$ is very high.

As the result, it is difficult to carry out high-speed data transmission or high-speed data communication in the data communication control device according to the prior art, which has a bus construction for switching the connection between the port 2 of the two-port memory 40 and the data bus $B_1$ or $B_2$ through the switch 70 and causing the competition on use of the data bus $B_3$ on the side of the port 1 in the memory 40.

SUMMARY OF THE INVENTION

This invention is given to solve the problem as mentioned above, therefore it is an object thereof to provide a data communication control device having an uncompetitive bus construction which enables high-speed data communication.

Accordingly, in the data communication control device of the present invention, the switch employed in the prior art is omitted, and the bus construction is composed by directly connecting a data bus on the side of a port 1 of a two-port memory in an FIFo/RAM to an NBI, a DMA and a microprocessor as well as directly connecting a data bus on the side of a port 2 of the two-port memory in the FIFo/RAM to the DMA. A system bus interface and the microprocessor are connected through a data bus independently so as not to cause competition on use of the bus on the side of the port 1 of the two-port memory.

Thus, in the data communication control device according to the present invention, it is not necessary to switch the data bus by a switch on the side of the port 2 of the two-port memory as described in the example in the prior art. Moreover, since competition on use of the data bus on the side of the port 1 in the two-port memory is not present, it becomes possible to carry out high-speed data communication. Incidentally, since it is not necessary to switch the data bus by a switch in the present invention, the control operation of the switch can be omitted.

These and other objects, features and advantages of the present invention will be more apparent from the following description of a preferred embodiment, taken in conjunction with the accompanying drawings.

BRIEF DESCRIPTION OF THE DRAWINGS

FIG. 4 is a diagram of another embodiment of a data communication control device according to the present invention.

DETAILED DESCRIPTION OF THE EMBODIMENT

Figure 1:
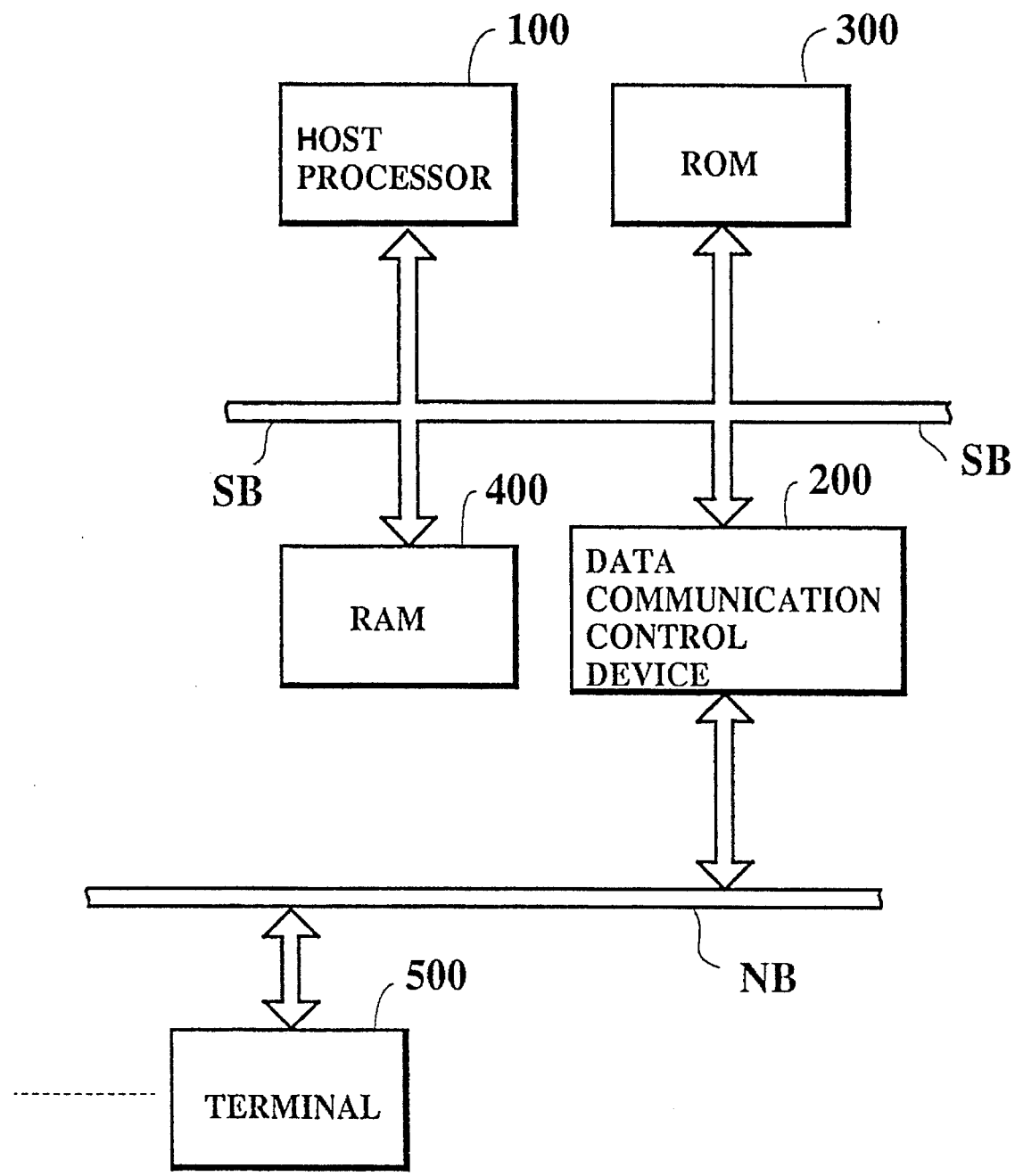
FIG. 1 is a diagram of a system in which a data communication control device is used.
Figure 3:
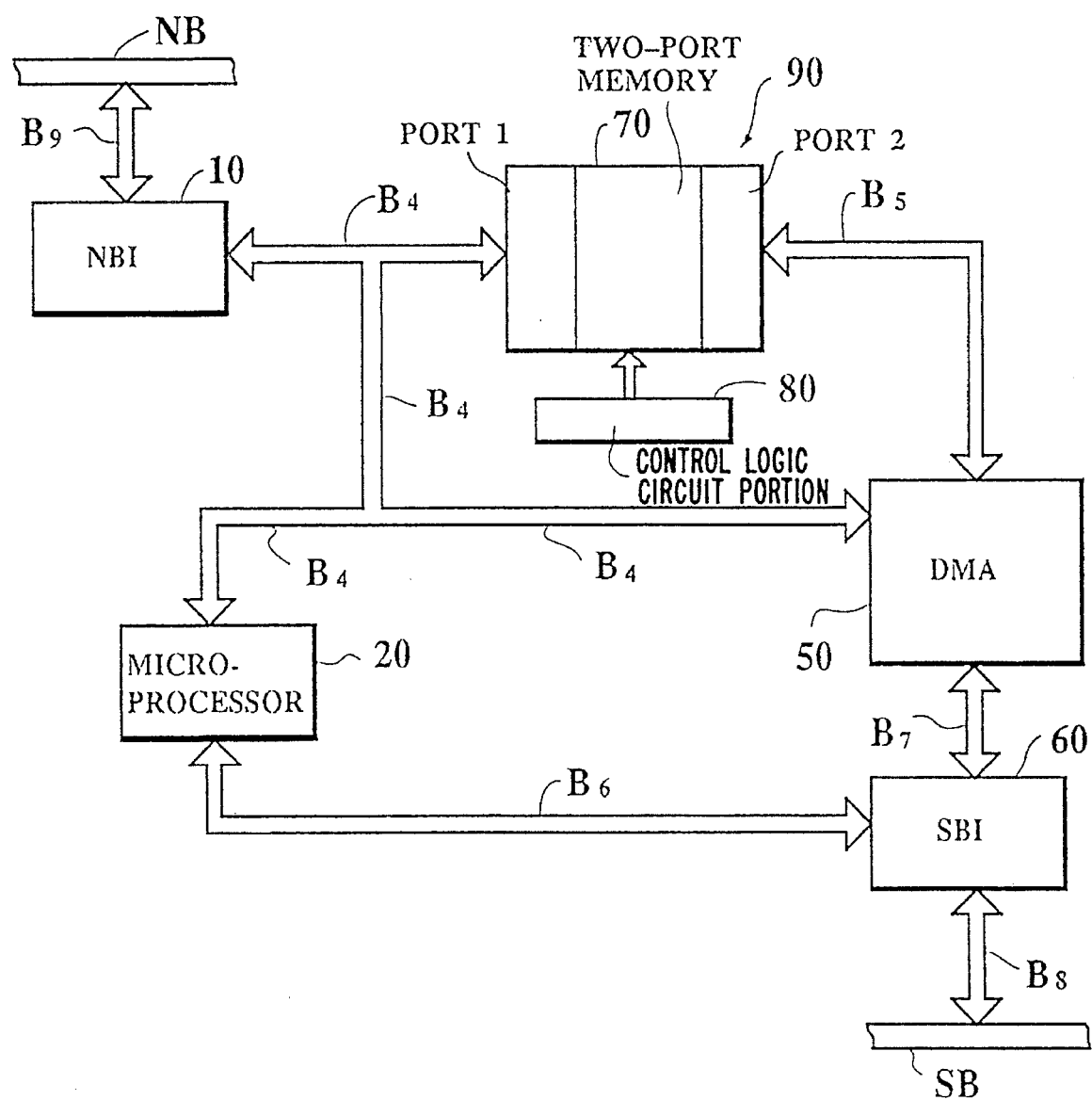
FIG. 3 is a diagram of an embodiment of a data communication control device according to the present invention.

FIG. 3 shows an embodiment of a data communication control device according to the present invention. The reference numerals and reference characters respectively have the same meanings as shown in FIG. 1. As shown in FIG. 3, the data communication control device includes a network bus interface (NBI) 10 connected to a network bus NB, a system bus interface (SBI) 60 connected to a system bus SB, and FIFo/RAM 90 which includes a two-port memory 70 for storing transmission data and a control logic circuit portion 80 for controlling the two-port memory 70, a direct memory access (DMA) 50 for executing access of the FIFo/RAM 90 including the two-port memory 70, and a microprocessor 20 for controlling the network bus interface (NBI) 10, system bus interface (SBI) 60, FIFo/RAM 90 and direct memory access (DMA) 50 on data transmission.

Moreover, the NBI 10, a port 1 in the two-port memory 70, the DMA 50 and the microprocessor 20 are connected by a bus $B_4$, and a port 2 of the two-port memory 70 and the DMA 50 are connected by a bus $B_5$. While, the microprocessor 20 and the SBI 60 are connected by a bus $B_6$, and the DMA 50 and the SBI are connected by a bus $B_7$, further the SBI 60 and the system bus SB are connected by a bus $B_8$. Additionally, the NBI 10 and the network bus NB are connected by a bus $B_9$.

Next, operation of the data communication control device according to the present invention having the construction as mentioned above is explained.

First, the data transmission mode from the system bus SB to the network bus NB is described with reference to FIGS. 1 and 3.

When a command of data transmission is transmitted from the host processor 100 to the data communication control device through the system bus SB, the command is given to the SBI 60 through the bus $B_8$, then is transmitted to the microprocessor 20 through the bus $B_6$. Then, transmission data are transmitted from the RAM 400 to the SBI 60 through the system bus SB, and given to the port 2 of the two-port memory 70 through the bus $B_7$, the DMA 50, and the bus $B_5$. The two-port memory 70 changes or arranges the transmission data in accordance with control of the microprocessor 20 which received the transmission command and the control logic circuit portion 80. Then, the transmission data arranged are given from the port 1 to the NBI 10 through the bus $B_4$. Thereafter, the transmission data are transmitted from the NBI 10 to the network bus NB through the bus $B_9$.

Next, the data reception mode from the network bus NB to the system bus SB is described.

First, a command of data reception is transmitted from the host processor 100 to the SBI 60 through the system bus SB and the bus $B_8$, and is given to the microprocessor 20 through the bus $B_6$.

Then, reception data are transmitted to the NBI 10 from the terminal 500 through the network bus NB and the bus $B_9$, and given to the port 1 of the two-port memory 70 through the bus $B_4$. The two-port memory 70 changes or arranges the reception data in accordance with control of the microprocessor 20 having received the reception command and the control logic circuit portion 80, then the reception data arranged are transmitted from the port 2 of the two-port memory 70 to the system bus SB through the bus $B_5$, DMA 50, bus $B_7$, SBI 60 and bus $B_8$.

In this embodiment, as described above, since switching means for switching the connection of the bus to the two-port memory is not included in the bus construction, it is not necessary to switch the connection of the bus on each transmission or reception of data. As the result, high-speed data transmission can be carried out.

Moreover, as shown in the embodiment in FIG. 3, since the FIFo/RAM 90 including the two-port memory 70 and the NBI are connected through the bus $B_4$, and the FIFO/RAM 90 and the DMA 50 are connected through the bus $B_5$ independently and directly as well as the switch means is omitted, transmission of data through the buses $B_4$ and $B_5$ can be carried out at the same time or in parallel.

Accordingly, high-speed data transmission can be realized certainly.

Figure 2:
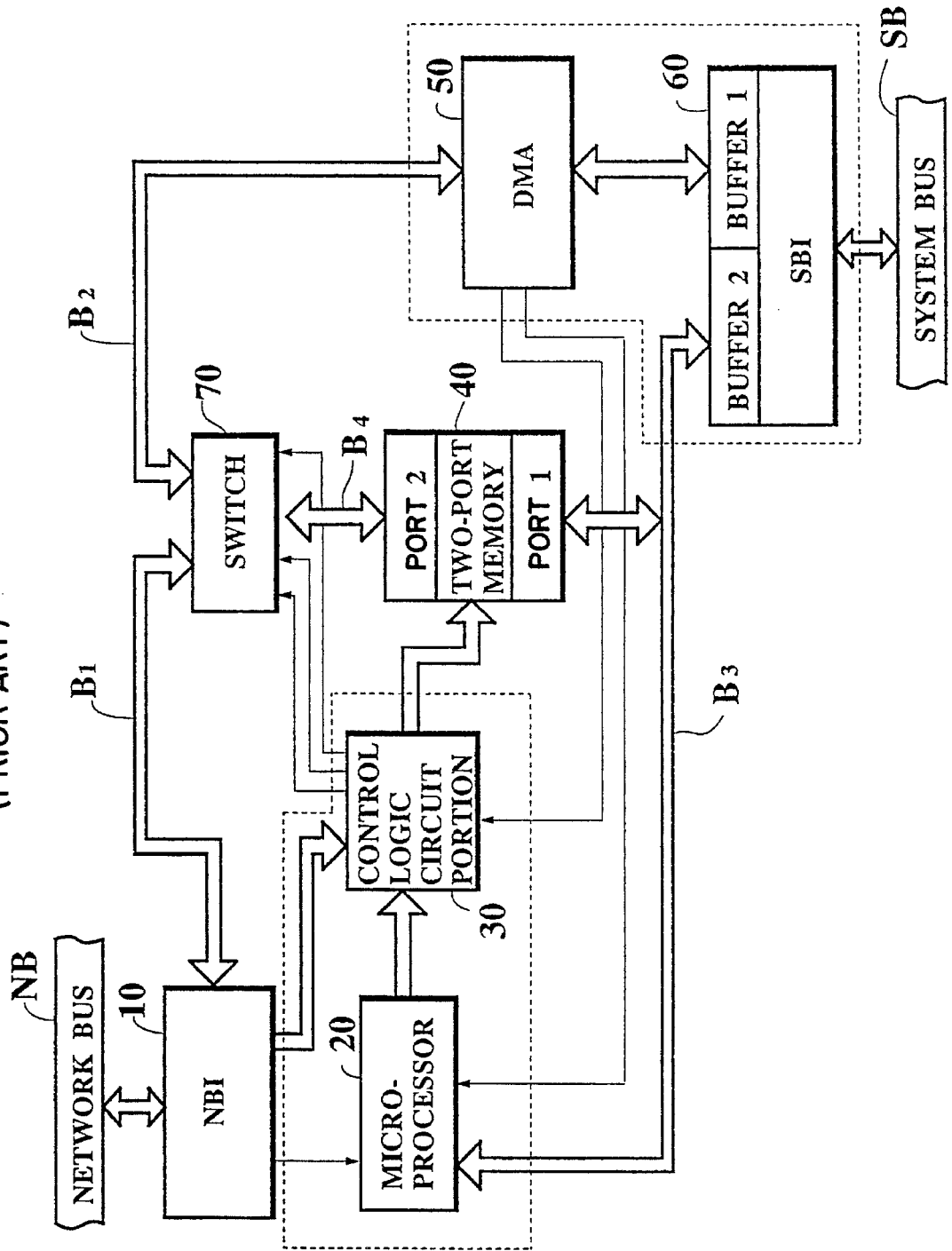
FIG. 2 is a diagram of a data communication control device according to the prior art.

Additionally, in this embodiment, since the microprocessor 20 and the SBI 60 are connected by the bus $B_6$ independently differently from the above example according to the prior art shown in FIG. 2, the competition which is caused by the command from the host processor in the example of the prior art can be avoided.

For example, in the system construction, when the communication speed is 4 Mbps, the clock frequency is 8 MHz, the microprocessor 20 is a 16-bit microprocessor and the bus $B_4$ is a 16-bit bus, the utilization rate of the internal bus $B_4$ in accordance with the microprocessor 20 based on our calculation by simulation is about 30%. Thus, the processing capacity of the system is sufficient even for the full operation of the microprocessor 20. Accordingly, even when the microprocessor is fully operated and the data transmission to the DMA is carried out at a relatively high speed, the competition is not generated so that it is becomes possible to carry out high-speed data communication as a whole.

FIG. 4 shows another embodiment of a data communication control device according to the present invention. The reference numerals and characters have the same meanings as in FIG. 3.

In this embodiment, the internal buses $B_4$, $B_6$ respectively connected to the microprocessor 20 of FIG. 3 are commonized into an internal bus $B_{10}$, and a microprocessor 20 and an SBI 60 are connected through the internal bus $B_{10}$. Since the construction of this embodiment other than the part described above is the same as shown in FIG. 3, detailed description on the same portion is omitted.

Also, in the internal bus construction of the embodiment shown in FIG. 4, the same effect or high-speed operation as described in FIG. 3 can be achieved. Namely, under the same conditions of the system construction as described in the embodiment of FIG. 3, i.e., under the communication speed of 4 Mbps, clock frequency of 8 MHz, 16-bit microprocessor as the microprocessor 20 and 16-bit bus as the bus $B_4$, the utilization rate of the internal bus $B_{10}$ between the NBI 10 and the FIFO/RAM 90 is about 12.5%, while the utilization rate of the bus $B_{10}$ in accordance with the microprocessor 20 is about 30% as described above. As the result, since the sum of both the utilization rates is only about 42.5%, the same effect as the embodiment shown in FIG. 3 can be obtained even when the internal buses $B_4$ and $B_6$ are commonized into the bus $B_{10}$.

As stated above, in the embodiments of a data communication control device according to the present invention, by omitting the switching means as seen in the prior art for the two-port memory and directly connecting the port 1 of the two-port memory to at least the microprocessor and the DMA, the data transmission between the port 2 of the two-port memory and the system bus through the DMA can be carried out a to a relatively high speed.

Moreover, since the competition on use of the internal bus between the microprocessor and the port 1 of the two-port memory can be avoided in the internal bus construction of these embodiments, the microprocessor can be fully operated. As the result, high-speed data transmission can be realized stably so much.

Various modifications will become possible for those skilled in the art after receiving the teachings of the present disclosure without departing from the scope thereof.

What is claimed is:

1. A data communication control device for transferring data between a system bus of a host computer and a network bus of a local area network, the control device comprising:

a system bus interface means, directly connected with said system bus, for exchanging data with said system bus;

a direct memory access means coupled with said system bus interface means;

a network bus interface means, directly connected with said network bus, for exchanging data with said network bus;

a two-port memory having first and second ports and directly connected with said network bus interface means and with said direct memory access means respectively, for temporarily holding data to be exchanged between said direct memory access means and said network bus interface means;

a control logic independently connected to the two-port memory for independently controlling the two-port memory;

a microprocessor directly connected to the first port of said two-port memory, said direct memory access means, said system bus interface means and said network bus interface means, for controlling data transfer between said network bus and said system bus;

a first bus having four branches, each branch directly connecting said direct memory access means, said network bus interface means, the first port of said two-port memory and said microprocessor, respectively;

a second bus directly connecting said direct memory access means to the second port of said two-port memory;

a third bus directly and independently connecting said system bus interface means to said microprocessor;

a fourth bus directly connecting said system bus interface means to said direct memory access means;

a fifth bus directly connecting said system bus to said system bus interface means; and a sixth bus directly connecting said network bus to said network bus interface means, wherein transmission data from said system bus or reception data from said network bus is transmitted through the first, second, fourth, fifth and sixth buses.

2. The data communication control device as claimed in claim 1, wherein, in a data transmission mode from the system bus to the network bus, a command of data transmission from the system bus is transmitted to the system bus interface means, from which the transmission command is transmitted to the microprocessor through the third bus, transmission data from the system bus is transmitted through the system bus interface means to the second port of the two-port memory through the fourth bus, the direct memory access means, and the second bus, the two-port memory arranges the transmission data in accordance with control of the microprocessor to transmit the transmission data from the first port to the network bus interface means through the first bus, and the transmission data is transmitted from the network bus interface means to the network bus.

3. The data communication control device as claimed in claim 1, wherein, in a data reception mode from the network bus to the system bus, a command of data reception from the system bus is transmitted from the system bus interface means to the microprocessor through the third bus, the reception data from the network bus is transmitted through the network bus interface means to the first port of the two-port memory through the first bus, and the two-port memory receives the reception data when the microprocessor has received the reception command, and arranges the reception data to be transmitted from the second port of the two-port memory to the system bus through the second bus, the direct memory access means, the fourth bus, and the system bus interface means.

* * * * *